May 21, 1940. L. A. YOUNG 2,201,806
METHOD OF UNITING METAL SURFACES
Filed Oct. 22, 1938
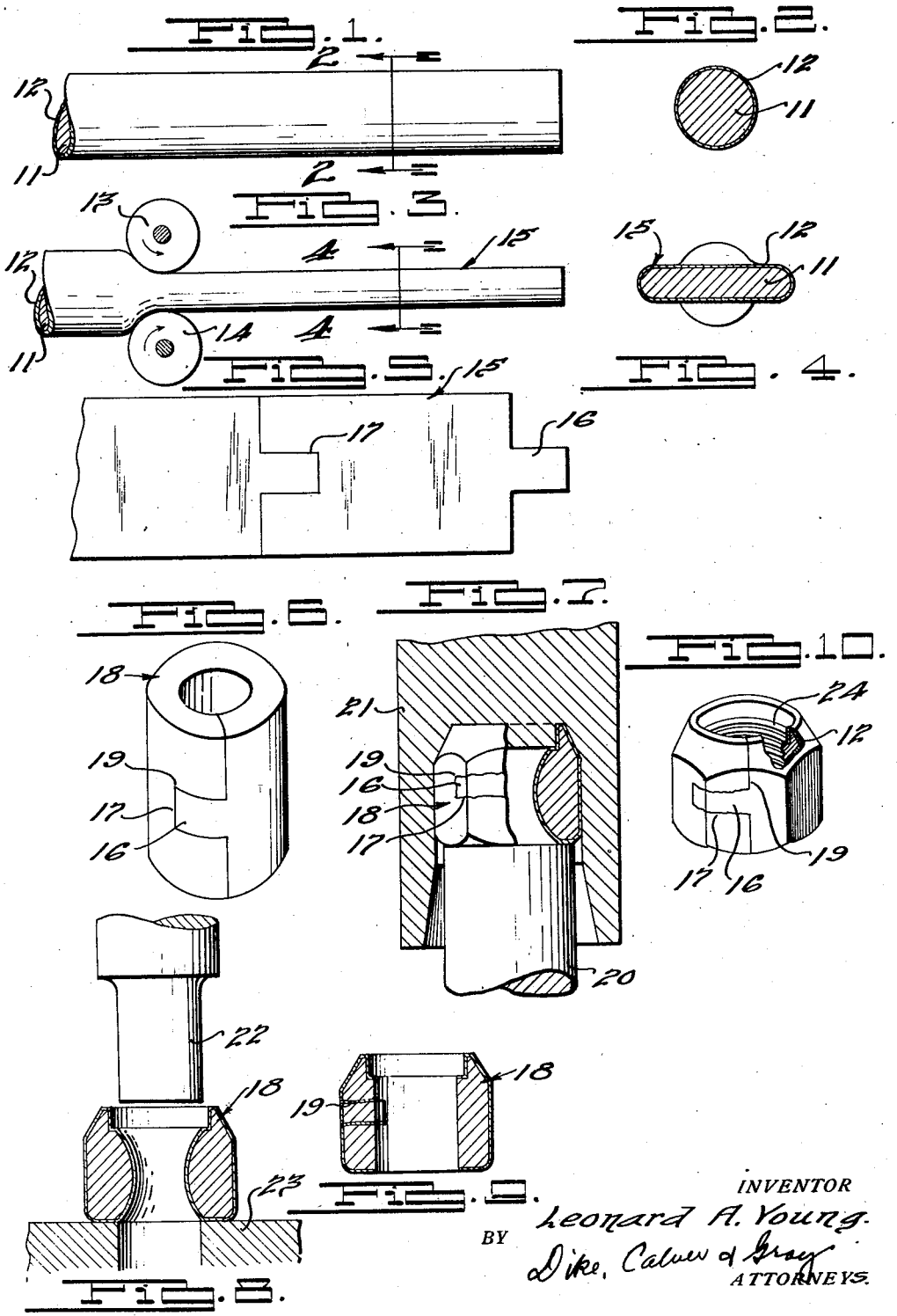
INVENTOR
Leonard A. Young.
BY Dike, Calver & Gray
ATTORNEYS.

Patented May 21, 1940

2,201,806

UNITED STATES PATENT OFFICE 2,201,806

METHOD OF UNITING METAL SURFACES

Leonard A. Young, Detroit, Mich.

Application October 22, 1938, Serial No. 236,587

6 Claims. (Cl. 10—86)

The present invention relates to a method of uniting metal surfaces such, for example, as two steel surfaces. In a preferred embodiment here disclosed by way of example but not of limitation, the method is applied in connection with the formation of a nut which may be formed as taught in the co-pending Oldham application Serial No. 212,532, which is assigned to me.

It is an object of the present invention to provide a method for mechanically uniting adjacent portions of two relatively hard metal surfaces and a body of relatively softer metal by the application of mechanical pressures thereto.

Another object of the invention is to provide a method of uniting adjacent portions of metal surfaces and of providing a ductile rust-proofing coating thereon.

Other objects of this invention will appear in the following description and appended claims, reference being had to the accompanying drawing forming a part of this specification wherein like reference characters designate corresponding parts in the several views.

The drawing in the present application corresponds in general to the drawing appearing in the said co-pending Oldham application Serial No. 212,532, in which is disclosed the Method of forming a wheel nut from a metal blank, and illustrates the application of the present invention thereto for the purpose of joining the adjacent portions of the metal blank.

Fig. 1 is a fragmentary side elevation of a metal blank which may be used to fabricate a nut in which the present method of uniting the adjacent portions of the metal surfaces is employed.

Fig. 2 is a cross section taken substantially on the line 2—2 of Fig. 1 in the direction of the arrows.

Fig. 3 is a view similar to Fig. 1 but showing a further step in the formation of the metal blank in which the circular blank of Fig. 1 has been flattened.

Fig. 4 is a cross section taken substantially on the line 4—4 of Fig. 3 in the direction of the arrows.

Fig. 5 is a fragmentary plan view showing the formation of a metal blank embodying the present invention.

Fig. 6 is a perspective view of the flat blank of Fig. 5 formed as a cylindrical blank.

Figs. 7 and 8 are diagrammatic sectional views showing further operations in the formation of a nut in which the metal surfaces are united by the method herein disclosed.

Fig. 9 is a sectional view of the blank after the completion of the operation shown in Fig. 8.

Fig. 10 is a perspective view with parts broken away showing a completed nut embodying the method of the present invention for uniting the adjacent metal surfaces.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

While I have chosen the formation of a wheel nut as an example of one embodiment of the invention it is to be understood that the invention is not limited thereto but is applicable broadly to the uniting of any adjacent metal surfaces by the application of mechanical pressures thereto.

A wheel nut with which the present invention is here shown is subjected to rigorous use and the exposed surfaces thereof must be protected against deterioration due to rust, corrosion, etc. The present invention provides a method of uniting the adjacent surfaces of the metal blank used in forming the nut, as well as at the same time providing a rustproof covering thereon.

Referring to the drawing, the blank is formed from a round metal stock 11, such for example as an iron or steel rod or wire. This wire is preferably formed with a coating 12 of copper or similar ductile non-oxidizing and non-corrodible material. The round blank is then flattened as shown in Fig. 3, as for example by the application of pressure exerted thereon by pressure rollers 13 and 14 to provide a flat section indicated generally at 15. The flat section is then cut as shown in Fig. 5 in such a manner as to provide a tongue 16 in one end of each section and a mating groove 17 in the opposite end thereof.

At the conclusion of the steps in Fig. 5, the blank has a plating of the material 12 on the faces thereof but does not have such a plating on the lines adjacent the staggered cut which forms the tongue 16 and the groove 17. These end sections may be copper plated prior to the forming of the blank 15 into the cylindrical blank 18 shown in Fig. 6 if it is desired to connect the ends of the blank solely by the application of mechanical pressures thereto. As there shown, the tongue 16 mates in the groove 17 and an intermediate layer 19, preferably of copper or similar ductile metal, is inserted between the two ends of the blank 18. As previously stated, this may be accomplished by plating the respective ends of the blank after the cutting operation or it may be done by inserting a thin sheet of copper or similar material during the formation of the cylindrical blank shown in Fig. 6.

If desired, the placing of copper or other ductile metal either as a plating or as a thin sheet adjacent the ends of the blank may be dispensed with and the parts connected by the application of mechanical pressures thereto and a subsequent heating in a hydrogen furnace whereby copper from the surface flows into the mechanical joint and welds or brazes the joint.

If desired, the steps in the formation of the blank in Figs. 1 to 5, may be dispensed with and the metal may be formed from a cut blank of sheet stock. The sheet stock may be copper plated either before or after the cutting operation. The copper plating of the round stock may be as shown in Figs. 1 to 5 inclusive, or the plating may be all done after the formation of the blank 15. In any event, the cylindrical blank as shown in Fig. 6 will be provided with a surface covering of the ductile metal such, for example, as copper, and will be provided with a layer of such metal between the adjacent ends of the surfaces to be united if the union is to be effected without heating.

The cylindrical blank is then subjected to an upsetting operation as shown in Fig. 7, in which a punch member 20 exerts pressure on the blank 18 and causes it to be pressed to conform to the opening in the female die member 21. This forms the exterior contour of the object such, for example, as the wheel nut, and causes the ferrous metal and the ductile covering 12 to cold flow in the manner shown. The tongue 16 and the mating groove 17 are elongated and the adjacent mating surfaces are rendered irregular. This causes the copper or similar metal 19 to flow into the irregular pattern of the adjacent faces of the tongue 16 and the groove 17 and unites the surfaces. The copper in effect impregnates the ferrous material due to the application of pressure in the upsetting operation shown diagrammatically in Fig. 7. The metal forms what in effect is a homogeneous mass, although the copper may still be separated from the body of the ferrous metal. The copper by the operation appears to be forced into the pores and surface irregularities of the surfaces of the ferrous metal. This effects an intimate engagement between the metal surfaces and the copper in much the same manner as when heat is applied to the copper and it is applied to such surfaces in a melted condition.

In order to remove excess metal which has flowed to the interior of the nut blank, a shearing punch 22, as shown diagrammatically in Fig. 8, may be employed to punch out the center of the nut blank 18 and cause the blank to assume the contour shown in Fig. 9. The interior of the nut may then be threaded as at 24 and the completed nut will then appear as shown in Fig. 10. As there shown, it will be seen that the nut has a covering 12 of the non-oxidizing, non-corrodible ductile metal such, for example, as copper and that the tongue 16 and the mating groove 17 serve to unite the two ends of the metal blank. The copper or ductile metal 19 occupies a position between the adjacent ends of the blank and serves as a uniting material which holds the parts firmly together.

In the embodiment of the invention shown in Fig. 10, the interior threads 24 are not copper plated. In an embodiment where copper plating of the threads is desired, this may be done after the nut is formed. Any other desired type of plating or rust-proofing treatment also may be employed.

The present method of uniting the metal surfaces, it will be seen, provides a union between the adjoining metal surfaces, which union is maintained by the flow of the deformable metal in response to the pressures applied to the blank during the upsetting operation. There is no welding of the parts in the conventional sense of the term as the action of the ductile metal is to form a mechanical union between the adjacent surfaces of the other metal. The upsetting operation provides a coined surface on the outer surfaces of the metal and serves to provide a highly polished surface thereon.

I claim:

1. The method of forming a nut from relatively flat stock having a core of relatively hard metal and a covering of relatively softer and more ductile metal by the application of mechanical pressures, which comprises forming a generally cylindrical blank from said flat stock, and upsetting said blank whereby the blank is permanently changed in form with the ends thereof anchored in a layer of said relatively softer and more ductile metal and the exposed surfaces covered with said relatively softer and more ductile metal.

2. The method of forming a nut from relatively flat stock having a core of relatively hard metal and a covering of a relatively softer and more ductile metal by the application of mechanical pressures, which comprises forming a generally cylindrical blank from said flat stock, upsetting said blank whereby the blank is permanently changed in form with the ends thereof anchored in a layer of said relatively softer and more ductile metal and the exposed surfaces covered with said relatively softer and more ductile metal, and removing excess metal from the interior of the formed blank.

3. The method of forming a nut from relatively flat stock having a core of relatively hard metal and a covering of a relatively softer and more ductile metal by the application of mechanical pressures, which comprises forming a generally cylindrical blank from said flat stock, upsetting said blank whereby the blank is permanently changed in form with the ends thereof anchored in a layer of said relatively softer metal, and thereafter subjecting the formed blank to heat to cause some of the relatively softer covering metal to flow into the mechanically formed joint between the anchored ends of the blank.

4. The method of forming a nut or similar annular metal article from flat stock, comprising the steps of forming a generally cylindrical blank from a sheet of relatively hard metal provided with a covering of a relatively softer and more ductile metal by the application of mechanical pressures thereto, and thereafter upsetting said blank whereby the blank is permanently changed in form and the ends thereof are anchored in a layer of said relatively softer and more ductile metal.

5. The method of forming a nut or similar annular metal article from flat stock, comprising the steps of forming a generally cylindrical blank from a sheet of relatively hard metal provided with a covering of a relatively softer and more ductile metal by the application of mechanical pressures thereto, and thereafter upsetting said blank whereby the blank is permanently changed in form due to the application of mechanical pressures of sufficient magnitude to cause the metal of said blank to cold flow and anchor the ends thereof in a layer of said relatively softer and more ductile metal.

6. The method of forming a nut or similar annular metal article from flat stock, comprising the steps of forming a generally cylindrical blank from a sheet of relatively hard metal provided with a covering of a relatively softer and more ductile metal by the application of mechanical pressures thereto, and thereafter upsetting said blank whereby the blank is permanently changed in form and the ends thereof are mutually deformed and secured together by mechanical union with an interposed mass of said relatively softer and more ductile metal.

LEONARD A. YOUNG.